United States Patent [19]

Simone

[11] 4,001,567
[45] Jan. 4, 1977

[54] BDC CORRECTED ADDER

[75] Inventor: Richard B. Simone, Sunnyvale, Calif.

[73] Assignee: National Semiconductor Corporation, Santa Clara, Calif.

[22] Filed: July 21, 1975

[21] Appl. No.: 597,567

[52] U.S. Cl. .............................................. 235/170
[51] Int. Cl.$^2$ ......................................... G06F 7/50
[58] Field of Search ........................... 235/169, 170

[56] References Cited

UNITED STATES PATENTS

| | | | |
|---|---|---|---|
| 2,947,479 | 8/1960 | Selmer | 235/169 |
| 2,989,237 | 6/1961 | Duke | 235/169 |
| 3,089,644 | 5/1963 | Wensley | 235/169 |
| 3,304,418 | 2/1967 | Perotto et al. | 235/169 |
| 3,508,037 | 4/1970 | Collins et al. | 235/169 X |
| 3,694,642 | 9/1972 | Grannis | 235/170 |

*Primary Examiner*—Jerry Smith
*Attorney, Agent, or Firm*—Lowhurst & Aine

[57] ABSTRACT

A BCD corrected serial adder includes an adder circuit and an asynchronous programmable logic array (PLA) connected to an output of the adder circuit. Whenever the sum of two bytes exceeds the decimal number 9 in the addition mode, the PLA simultaneously generates each bit of a byte which is equal to that sum plus the BCD equivalent of the decimal number 6. Whenever the sum of a minuend and the 2's compliment of the subtrahend is less than zero, the PLA simultaneously generates each bit of a byte which is equal to that sum plus the BCD equivalent of the decimal number 10. A circuit responsive to a carry supplied at an output of the PLA and to the most significant bit of the most significant digit of the subtrahend word generates a borrow which can be employed immediately by a main control circuit for making the necessary correction when the subtrahend word is larger than the minuend word.

7 Claims, 12 Drawing Figures

BDC CORRECTED ADDER

BACKGROUND OF THE INVENTION

1. Field of the Invention

This invention relates generally to an adder circuit, and more particularly to a BCD corrected serial adder for a serial processor.

2. Prior Art

Serial adders are employed for performing computations in serial processors. The information which is supplied to such adders is in the form of a binary word, with each word being formed of a plurality of bytes, each corresonding to a decimal digit. Each byte is formed of four bits in binary coded decimal (BCD) format. These adders operate on each bit of the same weight of two binary words at any given time, beginning with the least significant bit (LSB) of the least significant digit (LSD) and ending with the most significant bit (MSB) of the most significant digit (MSD), and generating a sum and a carry with each such operation until the two words are added together.

These adders are also capable of performing a subtraction operation by adding the minuend word to the 2's complement of the subtrahend. The sum which is produced as the result of that addition is equal to the remainder which would have been produced by subtracting the subtrahend word from the minuend word, with the exception that a carry is also produced if the result is greater than zero.

Whenever such an adder is performing an addition operation and the resultant sum of that operation for each digit or byte is greater than the decimal number 9, a correction must be made. Also, whenever such an adder is performing a subtraction operation and the resultant sum for each digit or byte is less than zero, a correction must be made. That is, when such an adder is operating in the subtraction mode, a byte carry which corresponds to the decimal number 16 signifies that the subtraction operation produced a remainder greater than zero.

One technique which has been employed in the past for performing such addition and subtraction operations utilizes two full adders, with a first one of those adders being employed for adding each bit of two words serially. The output of this first adder is supplied to a four bit shift register, such that each bit of the sum byte can be examined in the addition mode to determine if it corresponds to a decimal number greater than 9. In the subtraction mode, the absence of a carry during the addition of the most significant bits of the two bytes signifies that the remainder byte contained in the shift register is less than zero. A logic circuit is employed for recognizing these two conditions and for generating a correction signal in response thereto. Another logic circuit generates a byte corresponding to the decimal number 6 in the addition mode when the byte contained in the serial register corresponds to a decimal number greater than the decimal number 9, and generates a byte corresponding to the decimal number 10 in the subtraction mode when the byte contained in the serial register corresponds to a remainder less than zero. The byte contained in the serial register is then added to the byte generated by the second logic circuit in the second full adder.

It can be appreciated, that the above described technique for performing a BCD correction employs a feed forward arrangement in which the sum or remainder byte is first generated to determine if a correction is required and then a correction signal is generated and fed forward to a second full adder. Such a feed forward technique involves more delay than is desirable for performing certain operations associated with the BCD corrected adder circuit. Furthermore, such a technique requires the use of a second full adder and a flip flop for storing the carry output of that second adder in addition to that required for storing the carry output of the first full adder.

When such a BCD corrected adder circuit is employed in a serial processor, it is often possible that the entire subtrahend word is greater than the minuend work, such that the remainder word will be less than zero. Under such conditions, provision must be made for generating a borrow signal to be employed by a main control circuit associated therewith for performing an appropriate operation in accordance with the significance of that condition. For example, if the serial processor is performing a subtraction operation, such a borrow signal will be employed for displaying a negative sign in the display of the remainder and will cause the main control circuit to take the 2's compliment of the answer. If, however, the serial processor is performing a division operation by a series of subtractions the main control circuit must recognize this condition and shift either the minuend word or the subtrahend word with respect to one another so that the subtrahend word will appear to be less than the minuend word. Some of the BCD corrected adder circuits of the prior art which employ the above mentioned technique had no provision for generating such a borrow signal when the remainder word was less than zero. However, when such provision was made in such BCD corrected adder circuits, the borrow signal could not be generated in sufficient time for the main control circuit to act thereon immediately upon completion of the subtraction operation. Accordingly, such a serial processor employing the above described BCD corrected adder required one word time of idle before the required correction at the end of each word subtraction operation could be performed. It can be appreciated that such idle time is not desirable.

The above mentioned BCD corrected adder circuit also employes random logic which is not desirable for a number of reasons. For a complete discussion of the disadvantages of random logic as opposed to regular logic, reference is made to Pending Application for Patent, Ser. No. 584,637, filed June 6, 1975, of Richard B. Simone.

Another problem associated with the above mentioned BCD corrected adder is that it requires three separate timing signals for performing the BCD correction. The first of those timing signals is employed for detecting the presence of a byte which exceeds the decimal number 10 in the addition mode and for detecting the absence of a byte carry in the subtraction mode. That first timing signal is also employed for adding the 8 weight of the BCD number 10 to the uncorrected sum result in the subtraction mode of operation. The second timing signal is employed for adding the 4 weight of the BCD number 6 in the addition mode and the third timing signal is employed for adding the 2 weight of the BCD numbers 6 and 10 in the addition and subtraction modes, respectively.

Another BCD corrected adder circuit was recently developed which eliminated some of the problems of the above mentioned circuit, but created other problems. That circuit employs a look up technique in which each bit of a corrected sum byte is generated simultaneously without the addition of another byte thereto. More particularly, this circuit employs a programmable logic array (PLA) which examines each bit of a particular sum byte and generates the corrected sum byte with each bit thereof being generated simultaneously. This circuit, however, employed a synchronous PLA which would not permit the generation of a present carry and a correction signal simultaneously. As a result of this disadvantageous condition, it was not possible for this circuit to generate a borrow signal within the required time for the main control circuit to detect the required correction for the remainder word in the subtraction mode. More particularly, this circuit also required one word time of idle whenever such a borrow signal was generated. However, this circuit, because of the PLA employed therein, has all the advantages of the regular logic of such a PLA as discussed in the above mentioned application for patent. Furthermore, this circuit only required one timing signal for performing the BCD correction operation.

Accordingly, it can be appreciated that a need exists for a BCD corrected adder circuit which not only has all of the advantages of the above two mentioned circuits, but is capable of generating a borrow signal in sufficient time such that it may be employed by a main control circuit without requiring one word time of idle. In addition, such a BCD corrected adder circuit is needed which has a minimum number of components, thereby reducing the cost thereof.

SUMMARY OF THE INVENTION

Accordingly, it is an object of the present invention to provide a BCD corrected adder which requires only one serial bit adder circuit.

Another object of the present invention is to provide a BCD corrected adder which requires no idle time whenever a borrow is generated for correcting a remainder word.

Still another object of the present invention is to provide a BCD corrected adder which employs a look up technique for performing a BCD correction on each byte of a word.

Another object of the present invention is to provide a BCD corrected adder which requires only one timing signal for performing a BCD correction.

A further object of the present invention is to provide a BCD corrected adder which employs a feedback technique, rather than a feed forward technique, for generating a byte correction.

These and other objects of the present invention are attained by a BCD corrected adder which employs a bit serial adder and an asynchronous PLA connected to an output of that adder, which PLA is capable of simultaneously generating a present carry and a correction signal. Since the present carry, which is generated by the addition of the second most significant bits, can be sensed, it is possible for the circuit of the present invention to generate a borrow to be employed by a main control circuit without one word time of idle. Furthermore, these features of the present invention permit the utilization of a PLA which has one-third fewer partial product terms than that required in the synchronous PLA employed in the above mentioned BCD corrected adder circuit.

A feature of the present invention, therefore, resides in the provision of a PLA which permits the simultaneous generation of present byte carry and a correction signal. This accomplished by feeding back the byte carry to the PLA to generate such a correction signal with the generation of the byte carry.

The invention, however, as well as other objects, features and advantages thereof will be more fully realized and understood from the following detailed description, when taken in conjunction with the accompanying drawings, wherein:

DETAILED DESCRIPTION OF THE PREFERRED EMBODIMENT

Figure 1:
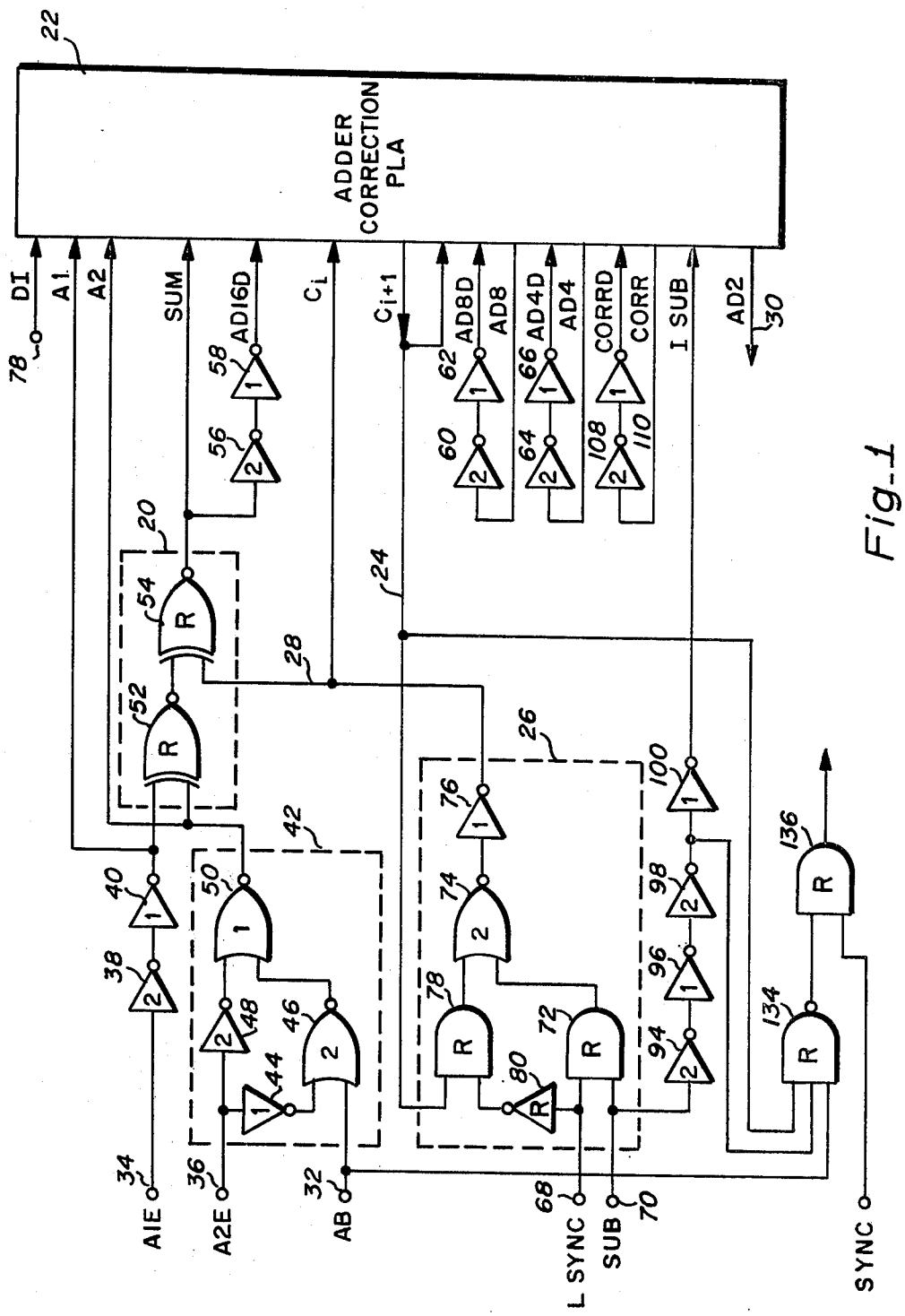
FIG. 1 is a partial block and partial logic diagram of a BCD corrected adder circuit constructed in accordance with the principles of the present invention.

With reference to FIG. 1, there is shown a BCD corrected adder circuit constructed in accordance with the principles of the present invention, which generally includes a serial bit adder 20 and a PLA 22 having one of its inputs connected to an output of the adder 20. The PLA 22 is a circuit formed of regular logic in which each input is separated from an output by two and only two logic gates. For a more detailed discussion of programmable logic arrays, reference is made to the above mentioned application for patent of Richard B. Simone. The PLA 22 is an asynchronous array in that its inputs and outputs are not clocked and signals pass therethrough virtually without any delay. The PLA 22 of the present invention may be formed of NOR gates when employed with negative logic levels or NAND gates when employed with positive logic levels. The BCD corrected adder circuit of the present invention will be described in connection with negative logic levels.

The bit serial adder 20 is responsive to binary bits supplied at the three inputs thereof for adding those three bits together to provide a summation thereof at its output, which summation is designated SUM. Two of the inputs which are supplied to the adder 20 are also supplied as inputs to the PLA 22 and are designated A1 and A2. The PLA 22 generates a carry signal on an output line 24. This carry will be designated as a present carry. A logic circuit 26 provides a one bit delay for the carry generated on the line 24 and supplied it to a third input of the adder 20 and to an input of the PLA 22 on a line 28. This delayed carry on the line 28 will be designated as a formerly generated carry. The present carry is generated in response to the A1, A2 and formerly generated carry in the well known manner. Accordingly, it can be appreciated that the adder circuit 20 in combination with the PLA 22 constitutes a full adder. As each bit of two bytes are added together serially, a sum byte will be formed which will appear at an output 30 of the PLA 22 as a serial stream of bits.

Some of the logic gates illustrated in FIG. 1 contain either the number 1 or the number 2, and others contain the letter R. These logic gates are MOS FET transfer gates. Any logic gate containing such a number is clocked at its input, such that its input is sampled only when such a clock pulse occurs. However, because of the storage capability of those gates, their outputs are always valid. Two such clock signals are employed which are out of phase with one another, a first of which is employed for enabling the inputs of the gates containing the number 1, and the second of which is employed for enabling the inputs of the gates containing the number 2. These phase timing signals are not shown for purposes of clarity of illustration. Those logic gates which contain the letter R are ratio gates which have virtually no delay in the transmission of signals therethrough.

The BCD corrected adder circuit illustrated in FIG. 1 is intended to be employed in a serial processor, such that the binary information supplied at an output of the PLA 22 on the line 30 is supplied to a register for storage thereof. The information contained in that register may be recirculated to an input of the adder circuit illustrated in FIG. 1, such that it may be subtracted from or added to a binary word derived from another source, such as another register.

With the above general description in mind, a more detailed description of the BCD corrected adder circuit illustrated in FIG. 1 follows below. The above mentioned recirculation data is supplied to an input terminal 32 in the form of a serial stream of binary bits. Input data which is not recirculation data is supplied to one of a pair of input terminals 34 and 36. In this exemplification of the present invention a minuend word will always constitute recirculation data and will be supplied to the terminal 32.

The terminal 34 is connected through two inverter gates 38 and 40 to one input of the bit serial adder 20 and to the input of the PLA 22 designated A1. The terminals 32 and 36 are connected as inputs to a logic circuit 42 which selects the data from one of the terminals 32 and 36 to be supplied to the other input of the bit serial adder 20.

The BCD corrected adder circuit disclosed herein is intended to be employed with a circuit disclosed in an application for patent of Manfred Gutmann, Ser. No. 595,116, filed on or about July 11, 1975. The circuit disclosed in that application for patent includes a plurality of logic circuits, each associated with a respective register of a serial processor, for example, and a register control PLA. The circuit disclosed in the Gutmann application permits the recirculation of data in a register without that data passing through the associated PLA. The logic circuit associated with one register permits any input data supplied from an external source or from another register and transmitted through the PLA to be supplied to that one register whenever an appropriate command is present at the input of that PLA to supply that input data to the associated register. In the absence of such a command, data in that register is recirculated without passing through the register control PLA. The logic circuit 42 is the same as one embodiment of the logic circuits disclosed in the Gutmann application. Accordingly, recirculation data is supplied to the terminal 32 and input data is supplied on the terminal 36, one of which will be added to the data supplied on the terminal 34. As previously mentioned, only recirculation data will contain a minuend word from which a subtrahend word supplied to the terminal 34 is subtracted.

As discussed in the Gutmann application, only command information will be generated at an output of the register control PLA disclosed therein during a first timing phase. The input to an inverter gate 44 is sampled during that first timing phase, as represented by the number 1, such that if a command is present during the first timing phase on the terminal 36, information on the terminal 32 will not pass through NOR gate 46. During the second timing phase, when the input on inverter 48 is sampled, data will be present on the terminal 36 if such a command was present during the next preceeding first timing phase. Accordingly, under such conditions, such data will be transmitted to one input of a NOR gate 50. However, if such a command is not present during the first timing phase on the terminal 36, the NOR gate 46, when its inputs are sampled, will supply data from the terminal 32 to a second input of the NOR gate 50. Such data will be transmitted through the NOR gate 50 to a second input of the bit serial adder 20 and to the second input of the PLA 22 which is designated A2.

The bit serial adder 20 includes a first EXCLUSIVE OR gate 52 and a second EXCLUSIVE OR gate 54. The outputs of the gates 40 and 50 are connected to respective inputs of the gate 52, and the output of the gate 52 is connected to one input of the gate 54. The formerly generated carry on the line 28 is supplied to a second input of the EXCLUSIVE OR gate 54, such that the three binary bits occuring at any given time on the inputs to the bit serial adder 20 will be added together to generate the SUM signal supplied at an input of the PLA 22.

The information generated at an output of the bit serial adder 20 is supplied through a pair of inverter gates 56 and 58 to an input of the PLA 22 which is designated AD16D. In the absence of any correction which may be required, the input AD16D is connected to an output of the PLA 22 which is designated AD8. This output is connected through two inverter gates 60 and 62 to an input of the PLA 22 which is designated AD8D. In the absence of any correction which may be required, the input AD8D is connected to an output of the PLA 22 which is designated AD4. This output is connected through a pair of inverter gates 64 and 66 to an input of the PLA 22 which is designated AD4D. Also, in the absence of any correction which may be required, the input AD4D is connected to an output of the PLA 22 which is designated AD2 and is generated on the line 30. Because of the clocked inputs of the gates 56–66, the information is delayed by one bit time in passing through a 2 gate and a 1 gate. Accordingly, when the most significant bit of a sum byte is present at the output of the bit serial adder 20, the second most significant bit of that byte will be present at the input AD16D, the second least significant bit of that byte will be present at the input AD8D, and the least significant bit of that byte will be present at the input AD4D.

When two words are being added together, one of which will be supplied to the terminal 34 and the other of which will be supplied to one of the terminals 32 or 36, it is possible that the addition of two bytes will result in a sum byte which is equivalent to a decimal number greater than 9. Table I contains a list of all of the possible sum bytes and the carrys generated at an output of the bit serial adder 20. The first column in Table I contains a list of the decimal numbers which the sum bytes and carrys represent.

TABLE I

| Decimal Number | Carry | Sum Byte | Corrected Carry | Corrected Sum Byte |
|---|---|---|---|---|
| 0 | 0 | 0000 | — | — |

TABLE I-continued

| Decimal Number | Carry | Sum Byte | Corrected Carry | Corrected Sum Byte |
|---|---|---|---|---|
| 1 | 0 | 0001 | — | — |
| 2 | 0 | 0010 | — | — |
| 3 | 0 | 0011 | — | — |
| 4 | 0 | 0100 | — | — |
| 5 | 0 | 0101 | — | — |
| 6 | 0 | 0110 | — | — |
| 7 | 0 | 0111 | — | — |
| 8 | 0 | 1000 | — | — |
| 9 | 0 | 1001 | — | — |
| 10 | 0 | 1010 | 1 | 0000 |
| 11 | 0 | 1011 | 1 | 0001 |
| 12 | 0 | 1100 | 1 | 0010 |
| 13 | 0 | 1101 | 1 | 0011 |
| 14 | 0 | 1110 | 1 | 0100 |
| 15 | 0 | 1111 | 1 | 0101 |
| 16 | 1 | 0000 | — | 0110 |
| 17 | 1 | 0001 | — | 0111 |
| 18 | 1 | 0010 | — | 1000 |
| 19 | 1 | 0011 | — | 1001 |

Since any machine associated with the adder circuit illustrated in FIG. 1 is not capable of recognizing a sum byte and its carry which is equivalent to a decimal number greater than the number 9, a correction must be made whenever such a sum byte and its carry are generated at the output of the serial bit adder 20. Not only must the sum byte be corrected, but in some cases the carry must be corrected, such that a carry will be supplied to the next byte being generated by the bit serial adder 20.

During the subtraction mode of the adder circuit illustrated in FIG. 1, the 1's complement of the subtrahend word is supplied to the terminal 34. The 1's complement of the subtrahend word is formed by inverting each bit of the subtrahend word. This inversion is performed by circuitry external to the adder circuit illustrated in FIG. 1. By generating a carry signal on the line 28 with the addition of the two least significant bits of the 1's complement of the subtrahend and the minuend, the subtrahend word is effectively converted to the 2's complement. As previously mentioned, when a minuend byte and the 2's complement of a subtrahend byte are added together, the resultant sum byte is identical to the remainder which would have resulted by subtracting the subtrahend from the minuend. In addition, however, a carry is also generated if the result is greater than zero.

It is also possible in the subtraction mode of operation that a remainder byte will be generated at an output of the bit serial adder 20 which corresponds to a decimal number less than zero. Table II contains a list of all of the sum bytes and the carrys which can be generated during the subtraction mode at an output of the bit serial adder 20. Column 1 of Table II contains the decimal numbers which are equivalent to the sum bytes and carrys which can be generated.

TABLE II

| Decimal Number | Carry | Sum Byte | Corrected Sum Byte |
|---|---|---|---|
| −9 | 0 | 1111 | 1001 |
| −8 | 0 | 1110 | 1000 |
| −7 | 0 | 1101 | 0111 |
| −6 | 0 | 1100 | 0110 |
| −5 | 0 | 1011 | 0101 |
| −4 | 0 | 1010 | 0100 |
| −3 | 0 | 1001 | 0011 |
| −2 | 0 | 1000 | 0010 |
| −1 | 0 | 0111 | 0001 |
| 0 | 1 | 0000 | — |
| 1 | 1 | 0001 | — |
| 2 | 1 | 0010 | — |

TABLE II-continued

| Decimal Number | Carry | Sum Byte | Corrected Sum Byte |
|---|---|---|---|
| 3 | 1 | 0011 | — |
| 4 | 1 | 0100 | — |
| 5 | 1 | 0101 | — |
| 6 | 1 | 0110 | — |
| 7 | 1 | 0111 | — |
| 8 | 1 | 1000 | — |
| 9 | 1 | 1001 | — |

It can be appreciated from Table II that whenever a sum byte is generated which represents a decimal number greater than zero, a carry is also generated during the addition of the two most significant bits of the two bytes being added in the bit serial adder 20. This carry is employed for converting the next subtrahend word from the 1's complement thereof to the 2's complement thereof. At the beginning of the subtraction mode, however, such a carry must be generated without relying on the carry signal generated by the PLA 22 on the line 24. The required carry signal, however, is generated by the logic circuit 26. For a better understanding of the logic circuit 26, reference will first be made to the idealized waveforms illustrated in FIGS. 7A–F.

Figure 7A:
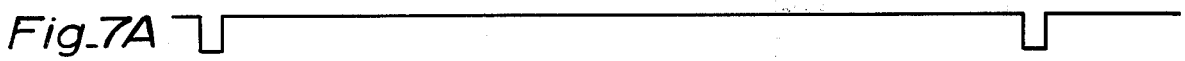
FIGS. 7A–F are graphical representations of idealized waveforms of certain signals employed in the circuit illustrated in FIG. 1.
Figure 7B:
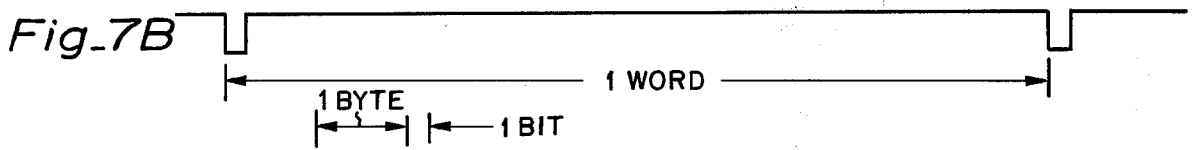
Figure 7C:
Figure 7D:

FIG. 7A illustrates the idealized waveform of an SYNC signal which is employed for synchronizing the operation of the machine in which the adder circuit illustrated in FIG. 1 is employed. FIG. 7B illustrates the idealized waveform of the SYNC signal delayed by one bit time. This signal is designated L SYNC and is supplied to a terminal 68 which forms an input of the logic circuit 26. It will be noted that the L SYNC signal goes to a low level (a binary one level) at the beginning of each word time. A signal designated SUB, the waveform of which is illustrated in FIG. 7D, will be at a low level whenever the adder circuit illustrated in FIG. 1 is in a subtraction mode, and will be at a high level whenever the adder circuit is in an addition mode. The SUB signal is supplied by a main control circuit (not shown) to a terminal 70 which forms another input to the logic circuit 26.

The terminals 68 and 70 are connected to respective inputs of an AND gate 72 having its output connected to one input of a NOR gate 74. Accordingly, whenever the L SYNC signal and the SUB signal are at a low level, the output of the AND gate 72 will go to a low level, thereby causing the output of the NOR gate 74 to go to a high level (a binary zero). The output of the NOR gate 74 is inverted by an inverter 76 and supplied to the line 28 to provide a carry at the beginning of each word and whenever the adder circuit is in the subtraction mode of operation.

During the addition mode of operation, any carry generated by the PLA 22 on the line 24 will be propagated through the logic circuit 26 with one bit time of delay on all but the addition operation performed on the least significant bit of the least significant byte of each word. That is, each such carry will be supplied to the bit serial adder 20 with one bit time of delay, except for the carry generated at the end of each word which will not be permitted to propagate to the beginning of the next word. This is accomplished by connecting the line 24 to one input of an AND gate 78 and the L SYNC signal through an inverter 80 to the other input of the AND gate 78. Whenever the L SYNC signal is at a low level (during the addition of the LSB of the LSD of each word), a carry on the line 24 will not propagate through the AND gate 78, otherwise it will. The output of the AND gate 78 is connected to a second input of the NOR gate 74. During the addition mode, the output of the AND gate 72 will always be at a high level, such that the output of the AND gate 78 will be propagated through the NOR gate 74 and the inverter 76 to the line 28.

From Table II, it can be appreciated that any sum byte which is generated which represents a decimal number less than zero cannot be recognized by the machine associated with the adder circuit illustrated in FIG. 1. Accordingly, all of those sum bytes and the carrys associated therewith must be corrected.

A timing signal designated DI is employed for performing the correction of the sum byte and carry whenever the output of the bit serial adder 20 corresponds to a decimal number greater than 9 in the addition mode or corresponds to a decimal number less than zero in the subtraction mode. The idealized waveform of the DI signal is illustrated in FIG. 7C, wherein it can be appreciated that this signal goes to a low level at the beginning of each byte. More particularly, when the signal DI goes to a low level, the most significant bit of a byte which is passing through the bit serial adder 20 will be at its output. The DI signal is supplied to an input of the PLA 22 on a terminal 78. When the DI signal goes to a low level, and when a correction is required, a corrected carry will be generated, if required, and a correction signal designated CORR will be generated at an output of the PLA 22. One bit time later, each bit of the sum byte is corrected. For a better understanding of the operation of the PLA 22, reference is made to FIGS. 2–6

Figure 2:
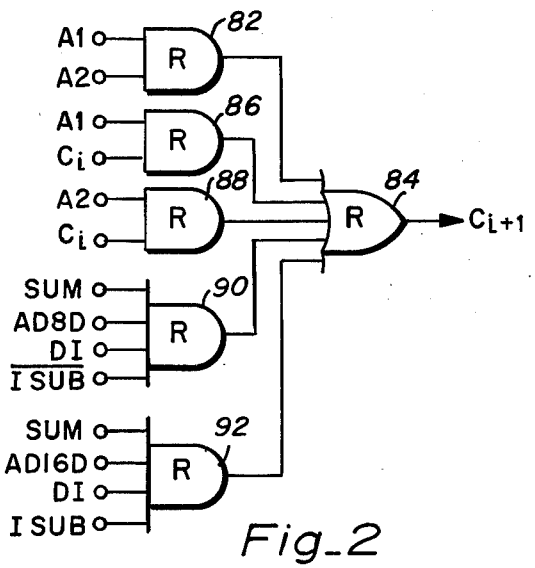
FIGS. 2–6 are equivalent logic diagrams of the logic circuits contained in the PLA illustrated in FIG. 1.

FIGS. 2–6 are logic diagrams which are equivalent to the logic circuits contained in the PLA 22. With reference to FIG. 2, the A1 and A2 inputs to the PLA 22 are supplied to an AND gate 82 having its output connected to one input of an OR gate 84. In addition, the A1 input to the PLA 22 and a formerly generated carry on the line 28 are connected to the inputs of an AND gate 86 having its output connected to another input of the OR gate 84. Also, the A2 input to the PLA 22 and a formerly generated carry on the line 28 are connected to the inputs of an AND gate 88 having its output connected to still another input of the OR gate 84. The output of the OR gate 84 constitutes the present carry discussed above. It can be appreciated that when any two or more of the three bits supplied to the serial bit adder 20 are a logical 1, a present carry will be generated on the line 24.

It will be noted from Table I that the carry produced with any sum byte equivalent to any decimal number between the numbers 10 and 15 must be corrected. These sum bytes have certain characteristics which are not shared by the other possible sum bytes. More particularly, either the most significant bit and the second least significant bit are a binary 1, or the most significant bit and the second most significant bit are a binary 1. These conditions are sensed by a pair of AND gates 90 and 92, each having their output connected through a respective input of the OR gate 84.

Figure 7E:
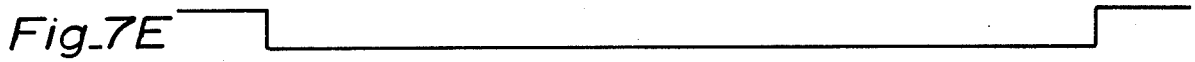

For a better understanding of the significance of the inputs supplied to the AND gates 90 and 92, reference is again made to FIG. 1. As shown therein, the SUB signal is supplied through four inverter gates 94, 96, 98 and 100 to supply a signal designated $\overline{I\,SUB}$ to an input of the PLA 22. The idealized waveform of the I SUB signal is illustrated in FIG. 7E. This signal is supplied to a respective input of each of the AND gates 90 and 92. Accordingly, when the I SUB signal is at a high level (binary 0 level), and the above conditions exist, a present carry will be generated at an output of the PLA 22 on the line 24. More particularly, when the DI is at a low level, the most significant bit of a sum byte will be at the SUM input of the PLA 22 and the second least significant bit thereof will be at the AD8D input of the PLA 22. Accordingly, when the adder circuit illustrated in FIG. 1 is in the addition mode as represented by the signal $\overline{I\,SUB}$, and the most significant bit and the second least significant bit of the sum byte are a binary 1 when the DI signal is at a low level, an output will be generated from the AND gate 90. Also, when the adder circuit is in the addition mode and the most significant bit and the second most significant bit of the sum byte are a binary 1 when the DI signal is at a low level, an output will be generated from the AND gate 92. Accordingly, the corrected carry shown in column 4 of Table I will be generated. Since a carry is generated at the completion of the addition operation which generates the sum bytes corresponding to the decimal numbers 16–19, no additional carry correction operation is required.

Figure 3:
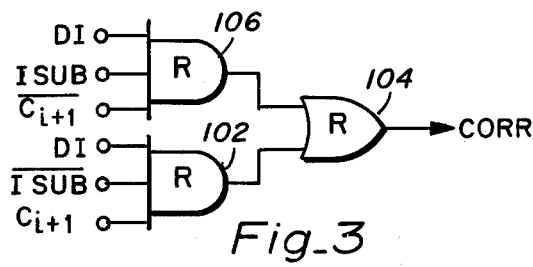
Figure 4:
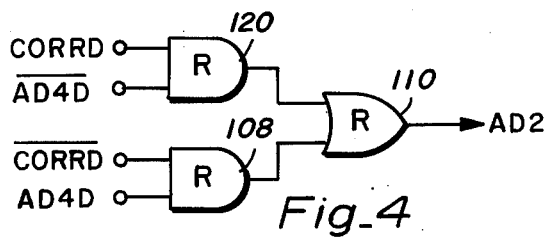
Figure 5:
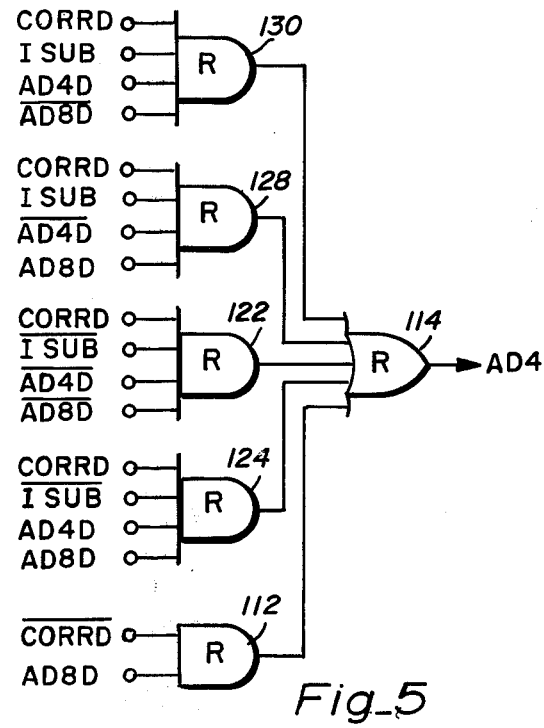
Figure 6:
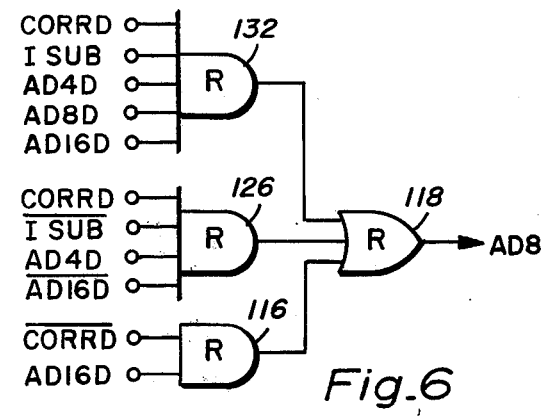

It will be noted from FIG. 1 that the present carry on the line 24 is fed back without any delay as an input to the PLA 22. This present carry is employed at the end of each byte in the addition mode for generating the CORR signal, if such a present carry exists at that time. Since such a carry will exist at that time whenever a sum byte is generated which must be corrected, the required correction signal CORR is generated to be employed subsequently for performing the necessary correction. As shown in FIG. 3, the presence of such a carry when the adder is in the correction mode and when the DI signal is at a low level will generate the CORR signal. This is performed by an AND gate 102 connected to one input of an OR gate 104 which generates the CORR signal at its output.

During the subtraction mode of operation, as shown in Table II, the absence of a carry at the completion of the addition operation which generates the sum byte indicates that the resultant sum byte must be corrected. In the subtraction mode of operation, therefore, the present carry generated at the completion of that addition operation need not be corrected. As previously discussed, this carry is employed for converting the 1's complement of the subtrahend byte to the 2's complement thereof. When such a present carry is absent, an output will be generated from an AND gate 106 when the DI signal is at a low level and the adder circuit is in the subtraction mode of operation. That output will also generate the CORR signal through the OR gate 104.

The CORR signal supplied at an output of the PLA 22 is delayed by one bit time when passing through inverter gates 108 and 110 before it is supplied to an input of the PLA 22 as a signal designated CORRD.

When the CORRD signal is generated, the most significant bit of the sum byte being corrected will be at the input AD16D, the second most significant bit will be at the input AD8D, the second least significant bit will be at the input AD4D, and the least significant bit will be at the output AD2 of the PLA 22. It will be noted that the least significant bit of an sum byte which is to be corrected does not change during such correction. Accordingly, the least significant bit existing at the output AD2 of the PLA 22 will not be changed. In the absence of a correction signal CORRD, the input AD4D will be supplied to the output AD2 without change, as performed by the AND gate 108 and OR gate 110 in FIG. 4. Also, in the absence of a correction signal CORRD, the input AD8D will be supplied to the output AD4 without change, as performed by the AND gate 112 and the OR gate 114 in FIG. 5, and the input AD16D will be supplied to the output AD8 without change, as performed by the AND gate 116 and OR gate 118 in FIG. 6.

It will be noted from Tables I and II that whenever a sum byte is to be corrected, its second least significant bit is changed from whatever binary level it is at to the opposite binary level. Accordingly, in the presence of the CORRD signal, the inverted binary level at the input AD4D is employed for generating the output AD2 of the PLA 22, as performed by AND gate 120 and OR gate 110 in FIG. 4.

It will be noted from Table I that the only time the second most significant bit of the corrected sum byte must be changed to a binary 1 is when the second most significant bit and the second least significant bit of the uncorrected sum byte are either both binary 1's or both binary 0's. Accordingly, in the presence of the correction signal CORRD, either of these two conditions will generate a binary 1 level at the output AD4, as performed by AND gates 122 and 124 and OR gate 114. If these conditions are not present when the correction signal CORRD exists, the output AD4 of the PLA 22 will be at a binary 0 level. It will also be noted from Table I that the only time that the most significant bit of the corrected sum byte must be a binary 1 is when the most significant bit of the uncorrected sum byte is a binary 0 and the second least significant bit thereof is a binary 1. Accordingly, when the correction signal CORRD exists under such conditions, a binary 1 will be generated at the AD8 output of the PLA 22, as performed by an AND gate 126 and OR gate 118 in FIG. 6.

From Table II, it will be noted that the second most significant bit of the corrected sum byte must be a binary 1 when the second most significant bit of the uncorrected sum byte is a binary 1 and the second least significant bit thereof is a binary 0, or when the second most significant bit of the uncorrected sum byte is a binary 0 and the second least significant bit thereof is a binary 1. Accordingly, in the subtraction mode of operation when the correction signal CORRD exists the above conditions will generate a binary 1 at the AD4 output of the PLA 22, as performed by AND gates 128 and 130 and OR gate 114 in FIG. 5. Also from Table II, it will be noted that the only time the most significant bit of the corrected sum byte must be a binary 1 is when the most significant bit, the second most significant, and the second least significant bit of the uncorrected sum byte are all binary 1's. Accordingly, in the subtraction mode of operation when the correction signal CORRD exists, this condition of the uncorrected sum byte will generate a binary 1 at the output AD8 of the PLA 22, as performed by an AND gate 132 and OR gate 118 in FIG. 6.

From the above, it can be appreciated that whenever a sum byte is produced at the output of the bit serial adder 20, it can be examined to determine if a correction is required. If such a correction is required, it is effected by simultaneously generating each bit of a corrected sum byte. This is made possible by a feedback arrangement for the present carry generated at an output of the PLA 22, such that the correction signal CORR is produced virtually without any delay and simultaneously with the present byte carry. In addition, however, this feedback arrangement permits a borrow signal to be generated which can be supplied to a main control circuit associated with the adder, such that the borrow signal will be present to permit the main control circuit to perform any needed correction immediately on the remainder word without one word time of delay.

In the machine associated with the adder circuit illustrated in FIG. 1, the last byte of any subtrahend word is a zero byte. Since the inversion of any subtrahend word is supplied to the terminal 34 to form the 1's complement thereof, the last byte of any subtrahend word will contain binary 1's in each bit thereof. If the last byte of a minuend word is greater than zero, or if the last byte of a minuend word is zero and a carry is supplied from the preceeding word, a carry will be produced with the addition of the most significant bit of the last bytes of the minuend and subtrahend words. If such a carry is produced, a borrow will not be generated, since such a condition signifies that the minuend word is greater than the subtrahend word. However, if the last byte of the minuend word is a zero and a carry is supplied thereto from the addition of the preceeding bytes, then a borrow is generated which signifies that the minuend word is smaller than the subtrahend word. Since the last byte of any subtrahend word will contain binary 1's in each bit thereof, the condition necessary for generating a borrow signal can be recognized by sensing the most significant bit of the last byte of a minuend word and the carry which is produced by the addition of the second most significant bits of the last bytes of the minuend word and the 2's complement of the subtrahend word. This condition is sensed by a NAND gate 134 and an AND gate 136 in FIG. 1.

Figure 7F:

More particularly, when the most significant bit of the minuend word is being supplied to the terminal 32, the carry generated by the addition of the second most significant bits of the last bytes of the minuend word and the 2's complement of the subtrahend word will be present on the line 24. The terminal 32 and the line 24 are connected to respective inputs of the NAND gate 134. In addition, the SUB signal which is inverted and delayed by one and one-half bit times is supplied to a third terminal of the NAND gate 134. The idealized waveform of the SUB signal which is inverted and delayed by one and one-half bit times and supplied to the NAND gate 134 is illustrated in FIG. 7F. Accordingly, when this signal is at a high level (binary 0 level) which signifies that the adder circuit is in the subtraction mode of operation, the presence of a binary 1 on either the line 24 or on the terminal 32 will not permit the generation of a binary 1 at an output of the NAND gate 134. More particularly, if a binary 1 exists on either one or both of the line 24 and terminal 32, a byte carry will be generated to signify that a borrow is not required. However, if a binary 0 exists on both the line 24 and the terminal 32 in the subtraction mode, a binary 1 will be generated at an output of the NAND gate 134. The output of the NAND gate 134 is connected to one input of the AND gate 136 and the SYNC signal is connected to the other input thereof. When the SYNC signal is at a low level, the most significant bit of the last byte of the minuend word will be present on the terminal 32. Accordingly, at that time, a borrow signal will be generated at an output of the AND gate 136 if the proper conditions described above exist. Because the byte carry which would have been generated can be anticipated by the circuit illustrated in FIG. 1, the borrow signal will be available at the main control circuit in sufficient time to permit whatever action is required thereby to be performed.

In the above description of the prior art, reference was made to a prior known BCD corrected adder circuit which employed a PLA. The PLA employed in that circuit is a synchronous PLA requiring 12 inputs and having 6 outputs and 25 partial product terms. The PLA illustrated in FIG. 1, however, is an asynchronous circuit which requires no clock inputs thereto and has only 11 inputs, 5 outputs and 17 partial product terms. Accordingly, it can be appreciated that the PLA illustrated in FIG. 1 is a considerably smaller and simpler PLA then that employed in the prior art for performing a similar function. Also, the adder circuit of the present invention is capable of generating a borrow signal in sufficient time such that the adder circuit need not idle for one word time.

The invention claimed is:

1. A BCD corrected adder having an addition mode and a subtraction mode, comprising:
   a. a serial adder circuit responsive to each bit of two bytes and to a formerly generated bit carry for generating a sum and a present bit carry;
   b. first means for generating a present byte carry whenever a present bit carry does not exist at the output of said adder during the addition of the most significant bit of a first byte and the most significant bit of a second byte, the result of which addition exceeds the decimal number ten in the addition mode;
   c. second means for generating a correction signal in response to the presence of one of said present carries during said addition in the addition mode, and for generating said correction signal in response to the absence of said present bit carry during the addition of the most significant bit of a minuend byte and the most significant bit of the 2's complement of a subtrahend byte in the subtraction mode; and
   d. logic means connected to said serial adder and said first and second means responsive to the presence of said correction signal for generating simultaneously with the generation of said byte carry from said first means, each bit of a byte which is equal to the summation of said first byte, said second byte, and a byte equivalent to the decimal number six in the addition mode, and for generating simultaneously with the generation of said byte carry from said first means each bit of a byte which is equal to the summation of said minuend byte, the 2's complement of said subtrahend byte, and a byte equivalent to the decimal number ten in the subtraction mode.

2. The BCD corrected adder of claim 1, wherein said means for simultaneously generating each bit of a byte includes a programmable logic array.

3. The BCD corrected adder of claim 1, wherein said means for generating a correction signal and said means for generating each bit of a byte are both formed of the same programmable logic array.

4. The BCD corrected adder of claim 1, wherein all of said generating means are formed of the same programmable logic array.

5. The BCD corrected adder of claim 1, further comprising means responsive to the most significant bit of the last byte of the minuend word and to the present carry generated by said adder circuit during the addition of the second most significant bits of the last bytes of the minuend word and the subtrahend word for generating a borrow signal.

6. The BCD corrected adder of claim 5, wherein a synchronizing signal is available for synchronizing the operation of said adder with an external associated machine, and said means for generating said borrow signal being responsive to said synchronizing signal.

7. The BCD corrected adder of claim 6, wherein said borrow signal is generated for immediate use by said associated machine.

* * * * *